July 12, 1927.
J. H. GILDERSLEEVE ET AL
1,635,362
WHEEL FOR DETACHABLE TIRES
Filed May 6, 1925
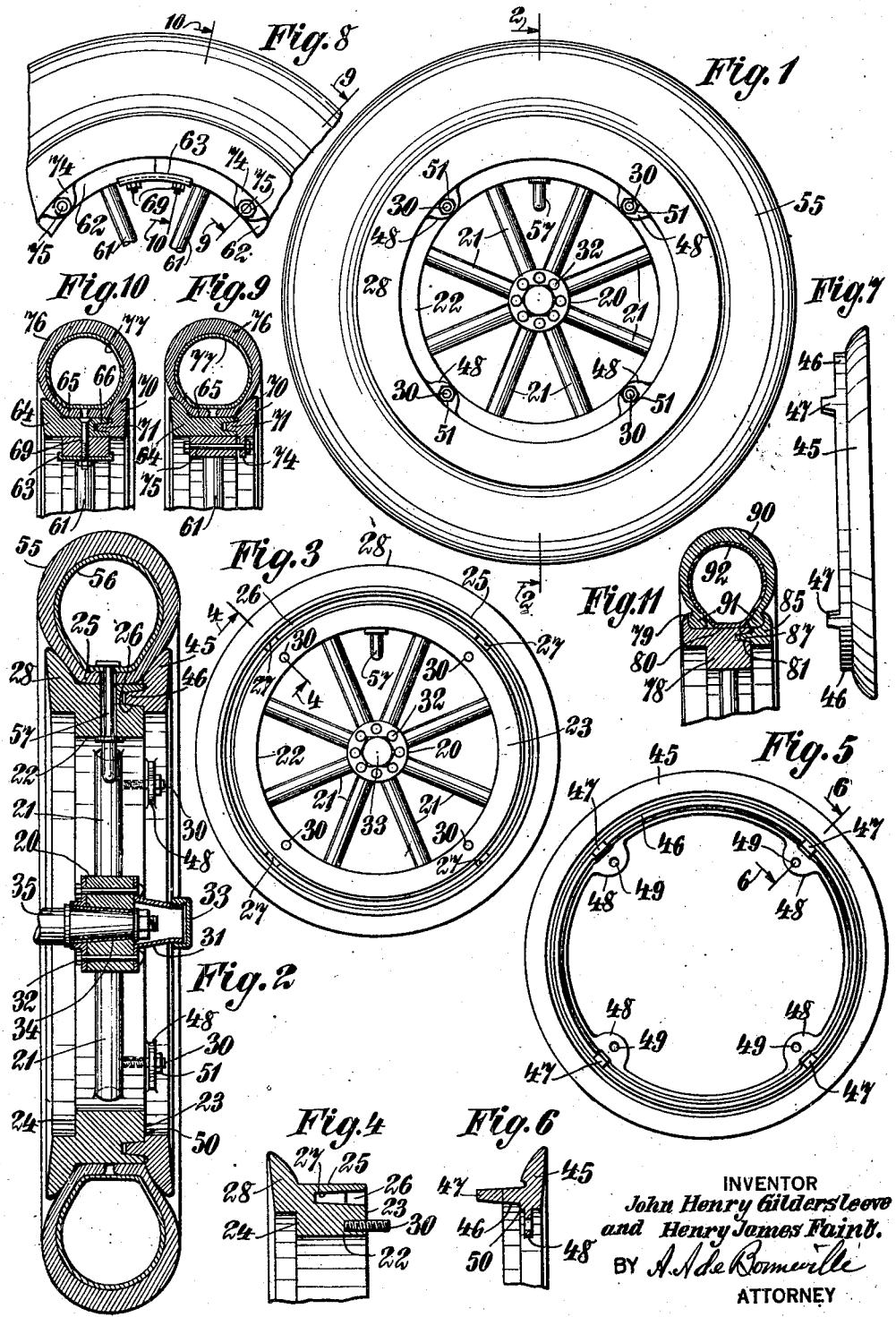
INVENTOR
John Henry Gildersleeve
and Henry James Faint.
BY A. A. de Bomerlli
ATTORNEY Patented July 12, 1927.

1,635,362

UNITED STATES PATENT OFFICE.

JOHN HENRY GILDERSLEEVE AND HENRY JAMES FAINT, OF CORONA, NEW YORK.

WHEEL FOR DETACHABLE TIRES.

Application filed May 6, 1925. Serial No. 28,328.

This invention relates to a wheel for detachable tires.

The object of the invention is the production of a wheel adapted to support tires that have to be replaced, and which have shoes with inner air or cushion tubes, and also tires without inner tubes, and those of various other construction. The second object of the invention is the production of a wheel which does not require removal from its axle, to change the tire thereof. The third object of the invention is the production of a wheel, on which a tire can be easily mounted or removed without stretching, and without the use of the ordinary tire irons, or other tools. The fourth object of the invention is the production of a wheel with a smooth tread, extending laterally across its circumferential face, between the flanges of the wheel, and which tread is devoid of any joints in its face, that would be injurious to the shoe or tube of the tire. A fifth object of the invention is the production of a wheel with means to make it dust proof, to prevent any dust passing through any of its joints to the shoe or to the tube of the tire. The sixth object of the invention is the production of a wheel, wherein its felly functions as a support for the tire, or in which a flange collar with a tread is fastened to the usual wooden felly of the wheel. The seventh object of the invention is the production of a wheel, which is adapted to support a straight sided shoe or one of the clincher type.

The organization of the invention comprises a wheel with a felly having a flange collar at one side thereof, and a detachable flange collar at its other side. The juncture of the tread of the wheel and the detachable flange collar is such, that a smooth circumferential surface is attained for the tread, for the full width of the wheel between its flanges, thereby avoiding any joints in the face of the tread that might injure the tire.

In the drawings Fig. 1 represents an outside elevation, of an exemplification of the improved wheel; Fig. 2 shows an enlarged section of Fig. 1 on the line 2, 2; Fig. 3 indicates a front elevation of the wheel with its flange collar detached therefrom; Fig. 4 represents an enlarged section of Fig. 3 on the line 4, 4; Fig. 5 shows an inside elevation of the flange collar of the wheel; Fig. 6 is an enlarged section of Fig. 5 on the line 6, 6; Fig. 7 shows a right hand side view of Fig. 5; Fig. 8 represents an outside elevation of a fragmentary portion of a modification of the wheel; Fig. 9 shows a section of Fig. 8 on the line 9, 9; Fig. 10 indicates a section of Fig. 8 on the line 10, 10 and Fig. 11 represents a sectional view similar to Fig. 2 with a further modification.

Referring to Figures 1 to 7 inclusive, the wheel is indicated in this instance with the hub 20, the spokes 21 and felly 22. The felly 22 in this instance is made of metal and is indicated with the outer side face 23 and the inner side face 24. The felly has formed therewith the smooth circumferential tread 25, below which is formed the tapered circumferential locking groove 26, and the plurality of tapered locking cavities 27. A flange collar 28 extends from the inner side face 24 of the felly. A plurality of studs 30 extend from the outer side face 23 of the said felly. The usual tapered sleeve 31 is secured to the said hub by means of the bolts 32. A screw cap 33 is in threaded engagement with the outer end of the sleeve 31, in the usual manner. A bushing 34 in the hub 20 is provided for the axle 35.

A detachable flange collar 45 has formed therewith the tapered locking ring 46, and from the latter extend a plurality of tapered locking lugs 47. A plurality of clamping lugs 48 each with an opening 49 extend from the inner circumferential face of the flange collar 45. A shoulder 50 is formed with the inner circumferential face of the flange collar 45 which locks with the face 23 of the felly 22.

When the flange collar 45 is in operative clamped position, the tapered locking ring 46 is engaged with the locking groove 26 of the felly 22, and the tapered locking lugs 47 are locked with the locking cavities 27. At the same time the clamping lugs 48 engage the studs 30 of the felly 20 and nuts 51 engaging the studs 30 clamp the flange collar 45 in place. The engagement of the locking lugs 47 with the locking cavities 27, prevents any creeping of the flange collar 45. The shoulder 50 of the flange collar 45 abutting against the outer face 23 of the felly 22, prevents any dust locating upon the tread 25 of the wheel.

The tire of the wheel is indicated with the straight sided shoe 55 and the inner tube 56, with the air valve 57 which latter extends through the felly 22.

To dismount the tire and replace it with another, the flange collar 45 is removed, after unscrewing the nuts 51 from the studs 30, when the tire can be easily removed from the tread 25 and replaced by another, after which the flange collar is again secured in place.

Referring to Figs. 8 to 10 inclusive the wheel is indicated with the spokes 61 which support in this instance the sections 62 of the felly of the wheel, in this instance of wood. The said sections 62 are connected by felly clips 63. A flange collar 64 with the smooth tread 65 is supported on the sections 62 of the felly of the wheel, and has formed therewith a locking groove 66 similar to the locking groove 26. The latter has formed therewith locking cavities similar to 27. Bolts 69 extend through the clamps 63, the sections 62 and the flange collar 64. A detachable flange collar is indicated at 70 which is similar to 45, and has extending therefrom the tapered locking ring 71, similar to 46. Locking lugs similar to 47 extend from the locking ring 71. Clamping lugs 74 similar to 48 extend from the flange collar 70, and bolts 75 connect the sections 62 of the felly and the lugs 74. A tire with the straight sided shoe 76 and the inner tube 77 is supported on the tread 65 and is held in place by the flange collars 64 and 70.

Referring to Fig. 11, this modification is shown with the felly 78 having the curved flange collar 79, the smooth tread 80 and the locking groove 81 similar to 26, with locking cavities similar to 27, not shown. A detachable curved flange collar is indicated at 85 with a tapered locking ring 87 similar to 46, and has formed therewith locking lugs, similar to 47. The flange collar 85 is held in place by means of locking clamps not shown similar to 48. The tire in this instance is of the clincher type and is shown with the shoe 90 having the open edge portions 91, which engage the curved flange collars 79 and 85. The inner tube is indicated at 92. The manner of replacing the tire in the modifications shown in 8 to 11 is similar to that already described.

Various modifications may be made in the invention and the present exemplification is to be taken as illustrative and not limitative thereof.

Having described our invention what we desire to secure by Letters Patent and claim is:

In a wheel for detachable tires, the combination of a felly having a flange collar at one of its side faces and having a tread extending across its outer circumferential face from said flange collar, said felly having a circumferential locking groove in its other side face, said groove having locking cavities formed therewith, a detachable flange collar with a locking rim extending therefrom, locking lugs integral with said rim, said rim normally engaging said circumferential locking groove and said locking lugs normally locking with said cavities and means to maintain said detachable flange collar with its ring and locking lugs in locked position with said felly.

In testimony whereof we affix our signatures.

JOHN HENRY GILDERSLEEVE.
HENRY JAMES FAINT.